United States Patent [19]

Thoma, III

[11] Patent Number: 5,038,301

[45] Date of Patent: Aug. 6, 1991

[54] METHOD AND APPARATUS FOR MULTI-MONITOR ADAPTATION CIRCUIT

[75] Inventor: Roy E. Thoma, III, Houston, Tex.

[73] Assignee: Compaq Computer Corporation, Houston, Tex.

[21] Appl. No.: 80,091

[22] Filed: Jul. 31, 1987

[51] Int. Cl.⁵ .............................................. G06F 3/12
[52] U.S. Cl. .................................... 364/521; 364/900
[58] Field of Search ............... 364/521, 200 MS File, 364/518, 900 MS File; 340/717, 718, 719, 808

[56] References Cited

U.S. PATENT DOCUMENTS

| | | | |
|---|---|---|---|
| 4,041,473 | 8/1977 | Bardotti et al. | 364/200 |
| 4,539,655 | 9/1985 | Trussell et al. | 364/900 |
| 4,651,278 | 3/1987 | Herzog et al. | 364/900 |
| 4,688,170 | 8/1987 | Waite et al. | 340/717 X |
| 4,757,441 | 7/1988 | Buckland et al. | 340/717 X |

Primary Examiner—Heather R. Herndon

[57] ABSTRACT

A method and apparatus for controlling two or more video display devices using a single display controller, where the display devices generally require different control data. Basic display control parameters are stored in a memory and, when the controller is to be switched from one display to another, the parameters are read from the memory into a substitution device. The substitution device receives modification control signals which depend on the newly selected display device and modifies the display control parameters before re-programming the display controller. The display controller then contains the parameters as appropriately modified for the currently controlled display device. The operator can switch from one monitor to another by generating an appropriate control signal, whereupon the substitution device again reads the control parameters from the memory, modifies them according to the newly selected display device, and re-programs the display controller using the modified parameters.

10 Claims, 4 Drawing Sheets

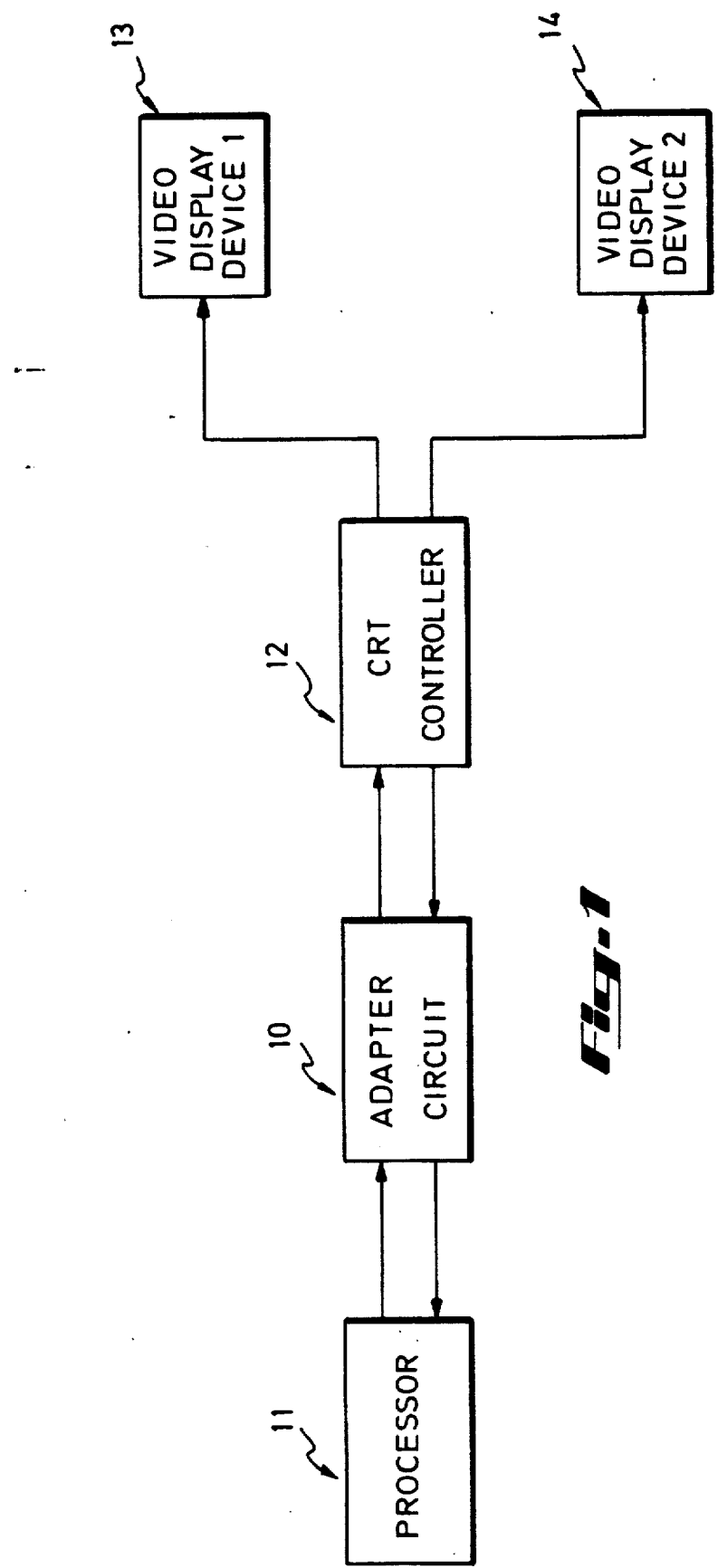

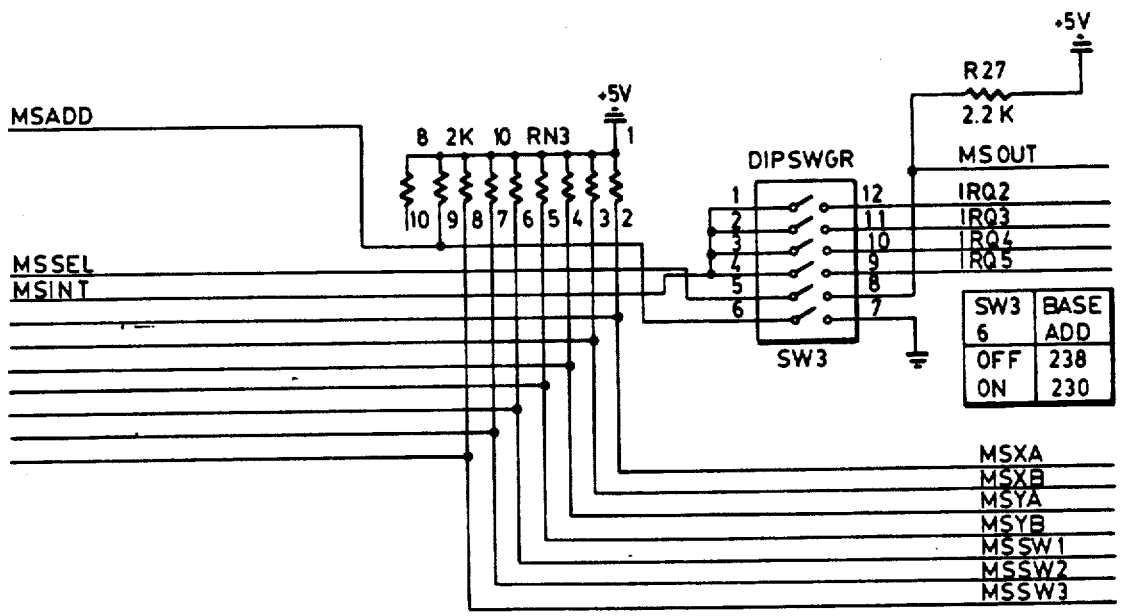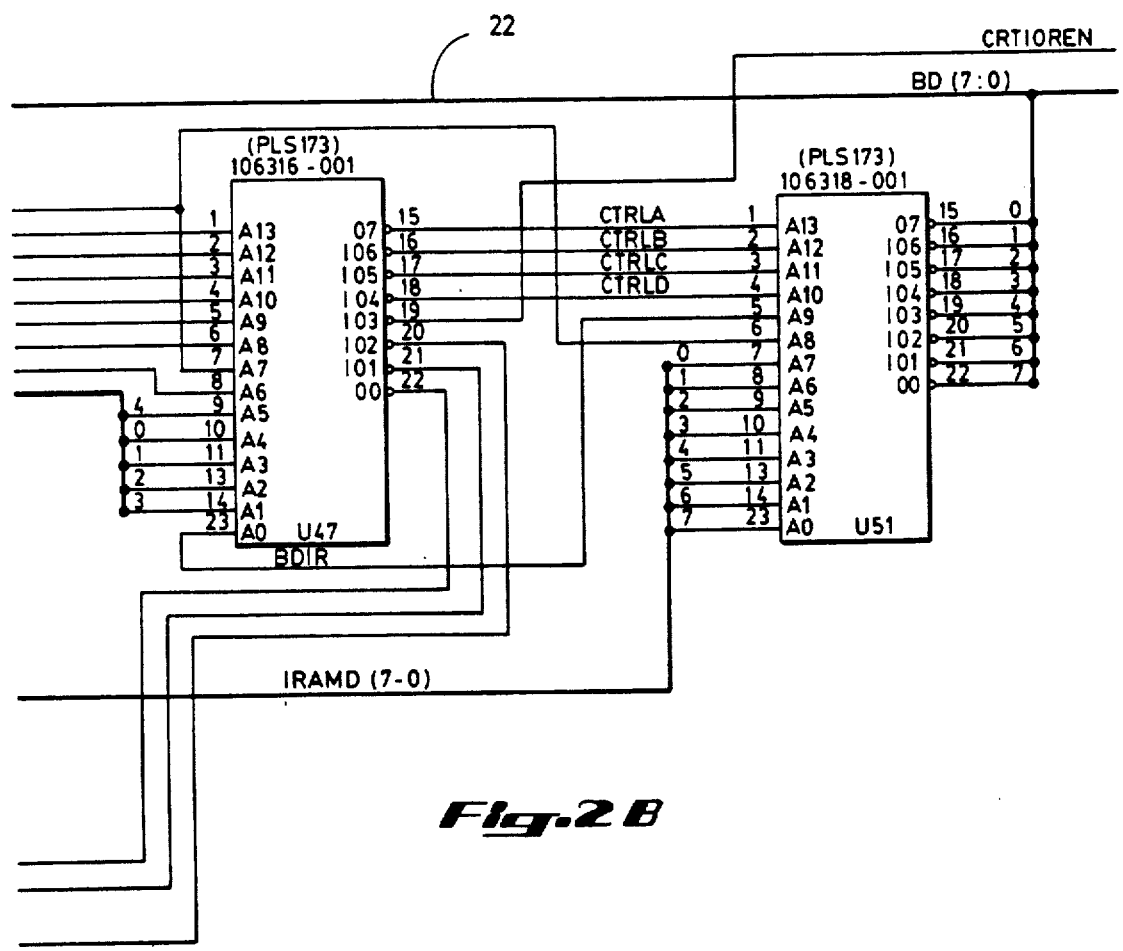
Fig. 2B

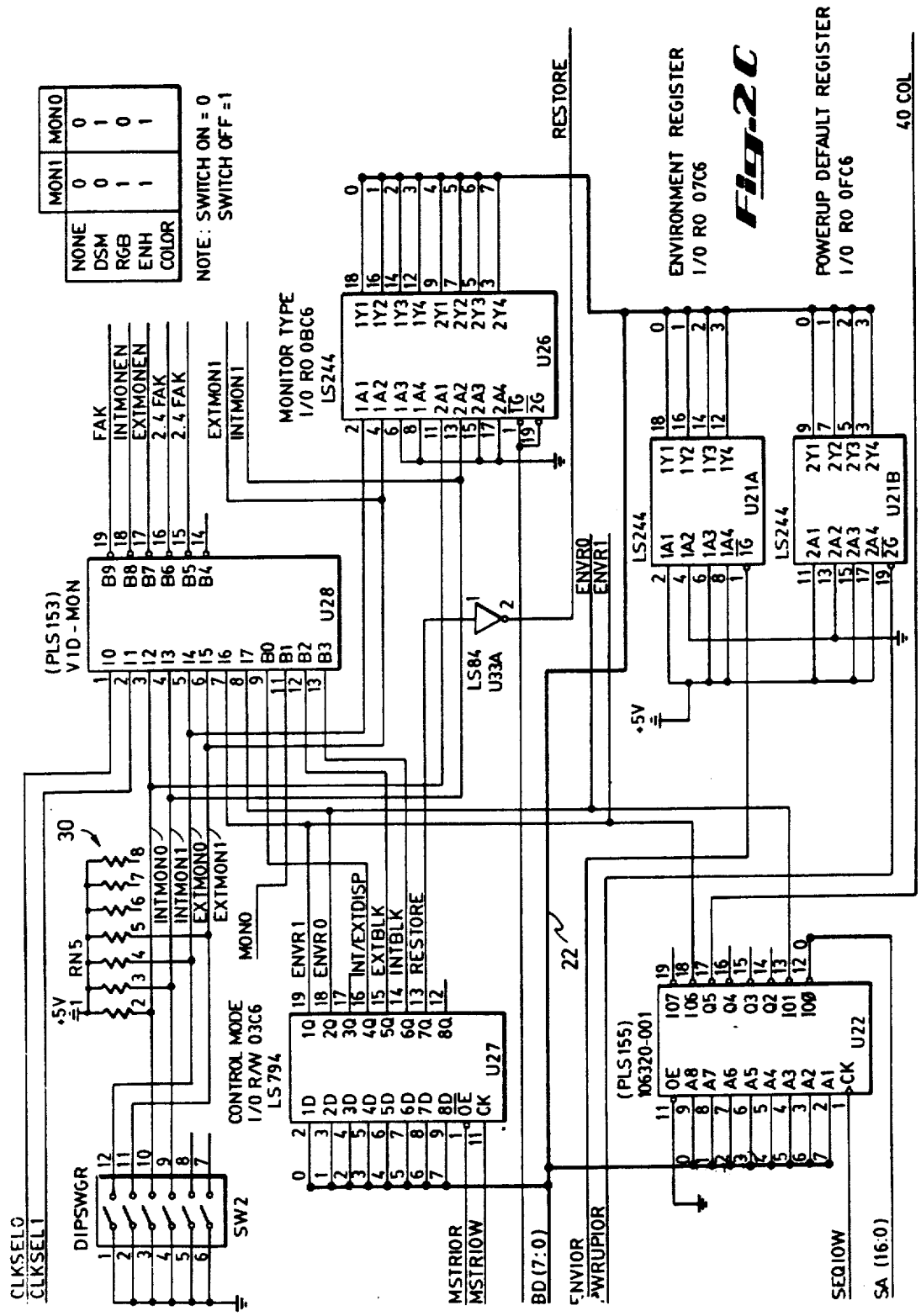

METHOD AND APPARATUS FOR MULTI-MONITOR ADAPTATION CIRCUIT

FIELD OF THE INVENTION

The present invention relates to control of video display devices by a computer and, specifically, to control of multiple display devices by a single computer, each display device having different control parameters.

BACKGROUND OF THE INVENTION

The personal computer industry has three basic graphics display standards. The "monochrome" display standard allows crisp text on a monochrome display using a 720×350 format, or 720 dots or pixels in each horizontal line and 350 horizontal lines on the display. The "color graphics adapter" (CGA) standard supports 16 different colors on a display using a 640×200 format. The 640×200 format is adequate for graphics and supports text modes, but the text is so coarse that it is not very useful. A third standard is known as the "enhanced graphics adapter" (EGA). The EGA has monochrome modes (720×350 text and 640×350 graphics) and color modes (640×350 text and graphics as well as 640×200 text and graphics). The multiple modes allow the EGA to drive the original monochrome monitor, the original color monitor, and the new enhanced color display having both 640×200 and 640×350 modes.

A dual scan monitor (DSM) has been developed which has a low scan mode which is the same as the industry standard color monitor and a high scan mode which is unique to a particular application. The low scan mode has a horizontal scan frequency of 15.7 KHz and a 60 Hz frame rate. The high scan mode has a horizontal scan rate of 18.5 KHz and a 50 Hz frame rate.

The horizontal and vertical scan rates in the 640×200 resolution mode of the enhanced color display, the standard color monitor, and the dual scan monitor are the same. As a result, a display controller can drive an enhanced color display and a dual scan monitor or a standard color monitor and a dual scan monitor in the 640×200 resolution mode at the same time.

However, the horizontal and vertical scan rates in the 640×350 resolution mode of the enhanced color display and the dual scan monitor are not the same. As a result, a single display controller cannot drive both an enhanced color display and a dual scan monitor in the 640×350 resolution mode at the same time.

SUMMARY OF THE INVENTION

The present invention enables a computer and a single display device, or CRT, controller to drive and control two or more display devices, each of which requires different control parameters. The control parameters for the CRT controller are typically provided from the computer according to software instructions. One embodiment of the present invention utilizes a memory device in conjunction with the CRT controller for storing control parameters which are used to program the CRT controller. Switches are used to indicate to the CRT controller the types of display devices connected to the computer. A control device, utilizing input from the switches, determines the monitor type which is being driven by the CRT controller at any particular time. A substitution device receives input from the control device and the storage device and, depending upon the type of monitor being driven, modifies the control parameters as they are read from the storage device or received from the computer and written to the CRT controller. A control signal generated from the computer keyboard triggers the control device to switch from one monitor type to another and, in response to that control signal, the CRT controller is reprogrammed with the appropriate control parameters as read from the storage device and modified by the substitution device.

BRIEF DESCRIPTION OF THE DRAWINGS

FIG. 1 is a block diagram showing a computer, an adapter circuit according to the present invention, a CRT controller, and two display devices, each of which may be driven by the CRT controller.

FIGS. 2A, 2B, and 2C are schematic diagrams of an adapter circuit according to the present invention.

DETAILED DESCRIPTION OF A PREFERRED EMBODIMENT

Figure 2A:
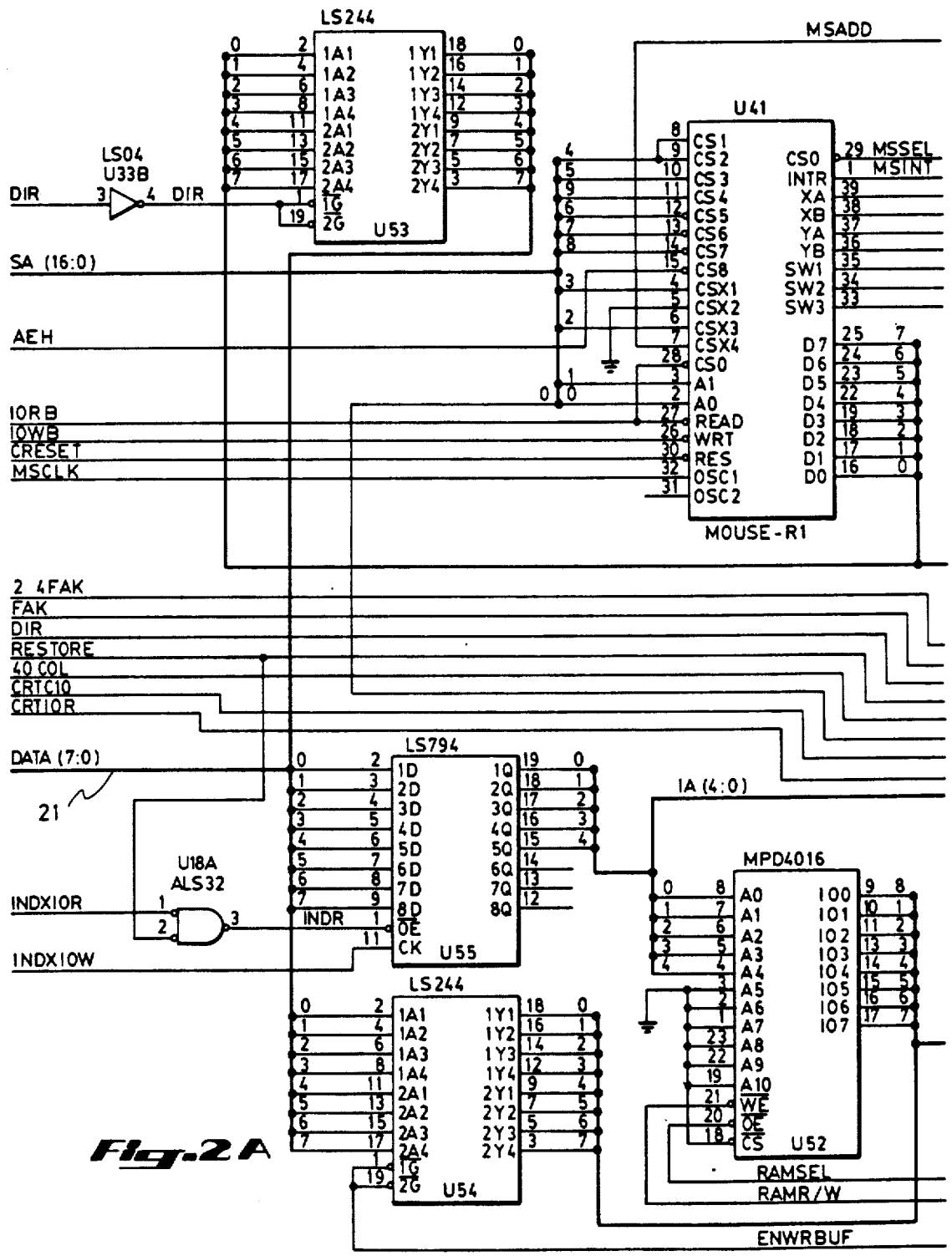

FIG. 1 shows a block diagram of a system utilizing an adapter circuit 10 according to the present invention. The adapter circuit 10 is interposed between the processor 11 and the CRT controller 12 and contains buffers, a memory device, and programmable logic devices. CRT control data is written by the processor 11 into the adapter circuit 10 which, in turn, either transmits those data directly to the CRT controller 12 or first modifies the data before transmitting them to the CRT controller 12. The processor 11 also sends display data through the adapter circuit 10 to the CRT controller 12 for display on the video display devices 13 and 14. The processor 11 may read data which is stored in the CRT controller 12 video data memory and that is accomplished through the adapter circuit 10.

FIGS. 2A, 2B, and 2C, together are a schematic diagram showing an adapter circuit according to the present invention. The data bus 21 connects the processor with the adapter circuit and provides a path for transfer of data between the processor and the adapter circuit. It is a bidirectional bus. Buffer U53 interconnects the data bus 21 with a bidirectional adapter board bus 22 and, when enabled, allows data to pass from the board bus 22 to the data bus 21. In this way, data can be read from the CRT controller, through the adapter circuit, to the processor. Buffer U54 interconnects the data bus 21 with a memory device U52 and a substitution device U51 and, when enabled, allows data to pass from the processor to the memory device U52 and the substitution device U51. As will become more clear below, the buffers U53 and U54 each allow uni-directional passage of data to the bidirectional data bus 21 and adapter board bus 22.

Also connected to the data bus 21 is an index register U55. The index register U55 is used in conjunction with the memory device U52 and with a control device U47. The use of the index register U55 will be explained in greater detail later.

Appendix B sets forth parts information for different components illustrated in FIGS. 2A, 2B and 2C. Appendix B is incorporated by reference as if set forth in full.

Switches SW2 are manually set switches which are used to indicate to the adapter circuit the types of monitors connected to the CRT controller. Four different monitor types are normally possible and each monitor type may be uniquely identified using two binary signals. Accordingly, a pair of switches and a pair of lines may be used to identify a single monitor type. In the embodiment shown in FIG. 2A, 2B and 2C, two different monitors are connected to the CRT controller and four switches in SW2 and four independent lines are used to indicate the two monitor types. A "pull-up" circuit 30 consisting of resistors is used in conjunction with the switches to provide "high" and "low" signals on the individual lines in response to the open or closed status of the individual switches.

A control mode register U27 accepts inputs to select which monitor(s) enable/disable and provides four output signals which are utilized in the present invention. Two of the signals are used to enable/disable the two monitors connected to the CRT controller. A third signal is a "tie breaker" if there are two monitors attached to the controller that can display in the programmed mode but not at the same time. The fourth signal, "RESTORE", is used whenever the CRT controller is to be switched from one monitor to another. That operation will be explained in more detail below.

Device U28 accepts input from the switches SW2 and from the control mode register U27 and generates signals which will, in part, determine the type of modifications to the video control parameters which might be necessary. For example, the device U28 generates signals which enable and disable the two monitors and it generates signals specifying whether any modification is needed for a color or monochrome mode. This will also be explained in more detail below.

Memory device U52 is a random access memory (RAM) which may be written to or read from and is used to store the display control parameters for later modification and transfer to the CRT controller. The memory device U52 receives its data input from the computer via the data bus 21 and the buffer U54. When the computer processor provides video control parameters for possible modification and transfer to the CRT controller, those parameters are simultaneously stored in the memory device U52 and written to a substitution device U51. This writing to the memory device will occur when the "write enable" signal is active to the memory device U52. As will be seen below, the "write enable" signal will be inactive when the CRT controller is being switched from one monitor to another. Otherwise, whenever the application program being executed by the processor calls for new display control parameters, the "write enable" signal will be active and those parameters will be written to the memory device U52 through the data bus 21 and the buffer U54.

The substitution device U51 receives input from the processor by way of the buffer U54. The substitution device U51 is a programmed logic device which contains instructions for modifying the display control parameters so that the desired monitor may be driven in the desired mode. The device U51 is connected to the buffer U54 and the memory device U52 such that its input may come from the buffer U54 or the memory device U52. Under conditions which will be more particularly specified below, the input to the substitution device U51 will be read from the memory device U52 and will not be transmitted from the processor through the buffer U54.

The index register U55 is also connected to the data bus 21 and is used in conjunction with the memory device U52 to address individual values stored in the memory device U52. The index register U55 also supplies address information to a control device U47 for use in generating modification signals.

The control device U47 accepts input from the device U28 and the index register U55, as well as other signals. Its output is used to control reading from and writing to the memory device U52 and to provide modification control signals to the substitution device U51. An "enable" signal for controlling the buffer U54 is also generated by the control device U47. The control device U47 is a programmed logic device.

Operation of the Adapter Circuit

The CRT controller typically has a number of programmable registers. These registers determine things such as the size of the character cell, the total number of horizontal lines, the horizontal blank time, the horizontal retrace time, the vertical blank time, the vertical retrace time, the size of the cursor and the location of the cursor.

The values programmed in these registers and the clock frequency selected determine the actual timing of the signals that drive the displays or monitors. Using a monitor that has different timing requirements than that expected by the software requires changing the drivers in the software or having the controller change the values as needed for the different monitor.

When the computer is initially powered up, the CRT controller is programmed according to the type of monitor expected by the software based on the clock frequency selected and the I/0 address decode selected. When the controller is programmed, the values in the software for the CRT controller are stored in the memory device U52 and the CRT controller is programmed.

The switches SW2 are selectively opened and closed to indicate to the adapter circuit the monitor types connected to the CRT controller. The device U28 receives input from the switches SW2 as well as clock select signals and generates signals indicating whether modification of the display control parameters will be necessary. Those signals, as well as others, will provide inputs for use by the control device U47 as will be explained below.

The control mode register U27 receives input regarding the monitor(s) to be selected. Device U28 uses the outputs from U27 and generates signals which enable/-disable each of the individual monitors. The control mode register U27 also receives a control signal as generated from the computer keyboard and, in response to the signal, activates the RESTORE bit at the output of the control mode register U27. The control device U47 receives as input the RESTORE bit signal from the control mode register U27. In addition, the device U47 monitors the outputs of the device U28, the direction control line, whether a 40-column or an 80-column mode is being programmed, the least significant address line and lines indicating CRT controller reads and writes. The control device U47 uses this information for a number of purposes. First, the control device U47 provides a write enable signal to the buffer U54 to turn on the buffer to enable data from the CPU to pass through the buffer. Secondly, U47 generates control signals to the memory device U52 to allow the writing of data into the memory device or the reading of data from the memory device. Third, the control device U47 provides control signals to the substitution device U51. These control signals are used by the substitution device U51 to modify the display control data which it receives from the processor or the memory device U52 and which it then passes to the CRT controller.

Application software which may be executed by a computer typically contains display control data which is used to program a CRT controller to appropriately control the monitor. Although these values may be changed during the course of the execution of the program, for purposes of explaining the operation of the present invention, it will be assumed that a program is run in which these control parameters are specified initially in the program and remain the same throughout.

When the application program is initiated in the processor, the video control parameters are output to the CRT controller through the adapter circuit. The "write enable" signal from the control device U47 enables the buffer U54 to pass the display control parameters from the processor into the adapter circuit. In addition, as the appropriate memory addresses appear in the index register U55, a "write enable" signal is applied to the memory device U52 to enable the data being passed to be written into the memory device U52. As the control parameter data is passed through the buffer U54 and stored in the memory device U52, it also passes to the substitution device U51. The switches SW2 having been set to indicate the monitor types attached to the CRT controller and device U28 having specified whether a parameter substitution is for a color mode or a monochrome mode, the control device U47 generates control signals CTRLA, CTRLB, CTRLC, and CTRLD as inputs to the substitution device U51. The device U51 modifies the parameter data received from the buffer U54 in accordance with the control signals received from the control device U47. Attached hereto as Appendix A is a table showing the various combinations of the control signals A through D, the values typically written by the application software, and the resulting modified value which is transmitted from the substitution device U51 to the CRT controller. Appendix A is incorporated by reference as if fully set forth.

The index register U55 is used to address the individual storage locations in the memory device U52. The transfer of the control parameters, and other data, from the processor to the adapter circuit is a two-step process. First, a register location is identified and that information is stored in the index register U55. Next, the data to be stored in the register is passed from the processor to the adapter circuit and is transmitted through the buffer U54. Continuing, a new register is identified and the data for that register is passed. This process continues until all the necessary data have been transferred.

As the control parameters are being transferred from the processor to the adapter circuit, the register identifications are being monitored by the control device U47. In response to those identifications and certain other inputs, the control device initiates the CTRLA through CTRLD signals to the substitution device U51. Those control signals are then used, as needed, to modify the data being transmitted from the processor through the data bus, through the buffer U54 to the substitution device U51. The data modification which occurs in the substitution device U51 is specified in Appendix A.

While the control parameter data is being processed by the adapter circuit, it is also being stored in the memory device U52. The index register signals are used to store the parameter signals in the proper locations in the memory device U52. After initial programming of the CRT controller and during operation of the application program, should the computer operator desire to transfer visual output to a second, different monitor, he will generate a control signal at the keyboard which will activate the RESTORE signal at the control mode register U27. This RESTORE signal is input to the control device U47 and a RAM "output enable" signal is generated by the control device U47 and applied to the memory device U52. At the same time, the "write enable" signal supplied from the control device U47 to the buffer U54 is deactivated to block the passage of data through the buffer U54.

The control device U47 then causes the parameter data stored in the memory device U52 to be output to the substitution device U51, one storage location at a time. The index register U55 is sequenced through the various registers which must be accessed and the control device U47 operates as though the application program were being originally initiated. That is, it generates the CTRLA through CTRLD signals and inputs them to the substitution device U51 as the device U51 is receiving the parameter data from the memory device U52. Because a different monitor is being accessed and it may need different control parameters, the CTRLA through CTRLD signals are likely to differ from those originally generated. Likewise, the modifications performed in the substitution device U51 will likely result in different control parameters being transferred to the CRT controller.

The computer operator can switch between the various monitors by generating the appropriate control signals at the keyboard. Each time this occurs, the RESTORE bit signal will be activated at the control mode register U27 and the reprogramming of the CRT controller will be performed by the sequential readout of control data from the memory device U52 as modified by the substitution device U51.

While the present invention has been described in terms of one specific embodiment, it will be understood by those of skill in the art that the invention may assume numerous different embodiments. Accordingly, the invention should be limited only by the scope of the appended claims.

APPENDIX A

APPENDIX A

| DISPLAY PARAMETERS | INDEX REGISTER | CTRL A | B | C | D | STD. VALUE | SUBST. VALUE |
|---|---|---|---|---|---|---|---|
| COLOR; 40 COL. | R00 | 0 | 0 | 0 | 1 | 2DH | 37H |
| COLOR; 40 COL. | R03 | 0 | 0 | 1 | 0 | 2DH | 13H |
| COLOR; 40 COL. | R04 | 0 | 0 | 1 | 1 | 28H | 30H |
| COLOR; 40 COL. | R05 | 0 | 1 | 0 | 0 | 6DH | 54H* |
| COLOR; 40 COL. | R06 | 0 | 1 | 0 | 1 | 6CH | 70H |
| COLOR; 80 COL. | R00 | 1 | 0 | 0 | 1 | 5BH | 70H |
| COLOR; 80 COL. | R03 | 1 | 0 | 1 | 0 | 37H | 03H |
| COLOR; 80 COL. | R04 | 1 | 0 | 1 | 1 | 51H | 60H |
| COLOR; 80 COL. | R05 | 1 | 1 | 0 | 0 | 5BH | 08H |
| COLOR; 80 COL. | R06 | 1 | 1 | 0 | 1 | 6CH | 70H |
| MONO | R00 | 0 | 0 | 0 | 1 | 60H | 70H |

APPENDIX A-continued

| DISPLAY PARAMETERS | INDEX REGISTER | CTRL A | B | C | D | STD. VALUE | SUBST. VALUE |
|---|---|---|---|---|---|---|---|
| MONO | R03 | 0 | 0 | 1 | 0 | 3AH, 1AH | 3EH** |
| MONO | R04 | 0 | 0 | 1 | 1 | 51H, 50H | 5CH |
| MONO | R05 | 0 | 1 | 0 | 0 | 60H, E0H | 64H*** |

*(Bit 7 unchanged)
**(Bits 7-5 unchanged)
***(Bit 7 unchanged)

APPENDIX B

APPENDIX B

| Component | Manufacturer |
|---|---|
| U27 | MMI (Monolithic Memories Incorporated) 74LS794 |
| U28 | Signetics (See Appendix C for Program) PLS-173 |
| U47 | Signetics (See Appendix D for Program) PLS-173 |
| U51 | Signetics (See Appendix E for Program) PLS-173 |
| U52 | Toshiba 2KX8 Static RAM |
| U53 | Texas Instruments 74LS244 |
| U54 | Texas Instruments 74LS244 |
| U55 | MMI (Monolithic Memories Incorporated 74LS794 |

It is to be understood that the above parts merely represent the parts used in the preferred embodiment. In many cases the parts are available from other vendors.

What is claimed is:

1. A method for controlling two or more video display devices using a single controller, comprising the steps of:
    transferring display control data to a memory device and to a substitution device;
    generating type signals indicative of the types of display devices to be controlled;
    generating first modification signals as determined by the type of a first display to be controlled;
    modifying the display control data inn the substitution device in response to the first modification signals;
    programming the controller using the display control data as modified in response to the first modification signals;
    generating a switch signal to change control from the first display device to a second display device;
    reading the display control data from the memory device into the substitution device;
    generating second modification signals as determined by the type of the second display device to be controlled;
    modifying the display control data in the substitution device in response to the second modification signals; and
    re-programming the controller using the display control data as modified in response to the second modification signals.

2. An adapter circuit for interfacing a single display controller with two or more video display devices, comprising:
    a memory for intercepting and storing display control parameters transmitted to said display controller;
    means for indicating types of display devices to be controlled by the controller;
    means for selecting a display device to be controlled and for generating a change signal; and
    a substitution device responsive to the change signal to receive display device data and to read display control parameters from the memory, for modifying the display control parameters in accordance with the display device data and for programming the display controller to control the selected display device.

3. The adapter circuit of claim 2, wherein said substitution device comprises a first programmable device having inputs coupled to said memory to receive said display control parameters and having outputs for producing modified display control parameters for programming the display controller.

4. The adapter circuit of claim 3, wherein the means for indicating types of display devices comprises switches that can be selectively opened and closed to generate binary signals.

5. The adapter circuit of claim 4 wherein the means for selecting a display device and for generating a change signal also generates a monitor signal, the adapter circuit further comprising a second programmable device having inputs for receiving said binary singles and said monitor signal, said second programmable device generating a modification signal for input to said substitution device.

6. The adapter circuit of claim 5, wherein the substitution device further comprises a third programmable device having inputs for receiving the modification signal and the change signal, said third programmable device having outputs for producing control signals for input to the first programmable device.

7. The adapter circuit of claim 3, further comprising a buffer having inputs for receiving data from a data bus and having outputs coupled to said memory and to said first programmable device, said buffer controlling input of display control parameters from the data bus to the memory and to the substitution device.

8. The adapter circuit of claim 7, further comprising an index register producing output signals received by said memory for controlling the storage of said display control parameters in selected locations in said memory.

9. An adapter circuit for enabling control of two or more video display devices requiring different video control parameters using a single display controller, comprising:
    a memory for storing first video control parameters;
    a buffer having outputs coupled to said memory for controlling input of said first video control parameters to said memory;
    a modification device having inputs coupled to said memory and to said buffer to alternatively receive said first video control parameters from said memory or from said buffer;

monitor indicating means for indicating types of video display devices to be controlled by said single display controller;

monitor selection means for selecting one of said video display devices to be controlled by said single display controller;

a programmable device having inputs for receiving signals from said monitor indicating means and said monitor selection mans for generating a modification signal in response to said signals received from said monitor indicating means and said monitor selection means; and a control device having inputs for receiving said modification signal and responsive to said modification signal to generate a control signal;

said modification device having inputs for receiving said control signal and responsive to said control signal to selectively modify said first video control parameters and generate second video control parameters for programming said single display controller.

10. The adapter circuit of claim 9, further comprising:

an index register having outputs for producing signals received by said memory and to said control device, for coordinating said first video control parameters with selected addresses in said memory.

* * * * *